United States Patent
Pham

(10) Patent No.: US 10,067,323 B2
(45) Date of Patent: Sep. 4, 2018

(54) EZ HI-DEF

(71) Applicant: Michael Pham, Westminster, CA (US)

(72) Inventor: Michael Pham, Westminster, CA (US)

(73) Assignee: KINGHOME ENTERPRISE, Xindian Dist., New Taipei (TW)

( * ) Notice: Subject to any disclaimer, the term of this patent is extended or adjusted under 35 U.S.C. 154(b) by 5 days.

(21) Appl. No.: 15/062,258

(22) Filed: Mar. 7, 2016

(65) Prior Publication Data
US 2017/0254994 A1    Sep. 7, 2017

(51) Int. Cl.
G02B 17/00    (2006.01)
G02B 17/08    (2006.01)
G02B 7/14    (2006.01)

(52) U.S. Cl.
CPC ............. *G02B 17/08* (2013.01); *G02B 7/14* (2013.01); *G02B 17/002* (2013.01)

(58) Field of Classification Search
CPC ......... G02B 17/08; G02B 7/14; G02B 17/002
USPC ....................................................... 359/726
See application file for complete search history.

(56) References Cited

U.S. PATENT DOCUMENTS

| | | | | |
|---|---|---|---|---|
| 2,045,093 A | * | 6/1936 | Newcomer | G03B 35/24 352/57 |
| 2010/0097697 A1 | * | 4/2010 | Takemura | G02B 7/028 359/399 |

OTHER PUBLICATIONS

U.S. Appl. No. 12/609,310, filed Oct. 30, 2009, Michael Pham.
U.S. Appl. No. 61/946,455, filed Jan. 6, 2014, Michael Pham.
Fredrik Nilsson, "In the Best of Light: the Challenges of Minimum Illumination," Axis Communication, Sep. 14, 2010, 1-7, www.axis.com.

* cited by examiner

*Primary Examiner* — Thomas K Pham
*Assistant Examiner* — Vipin Patel

(57) ABSTRACT

EZ Hi-Def. device is comprised of 6 round bars arranged in a hexagon and a base ring. Round bar handles are located outside of base ring to make the shape of hexagon smaller or bigger, so that bars don't block the live view of the camera or don't show in a photograph. Six round bars reflect light to the camera lens to provide two critical factors to capture a high definition photograph: more image data and increased light sensitivity of the camera.

8 Claims, 9 Drawing Sheets

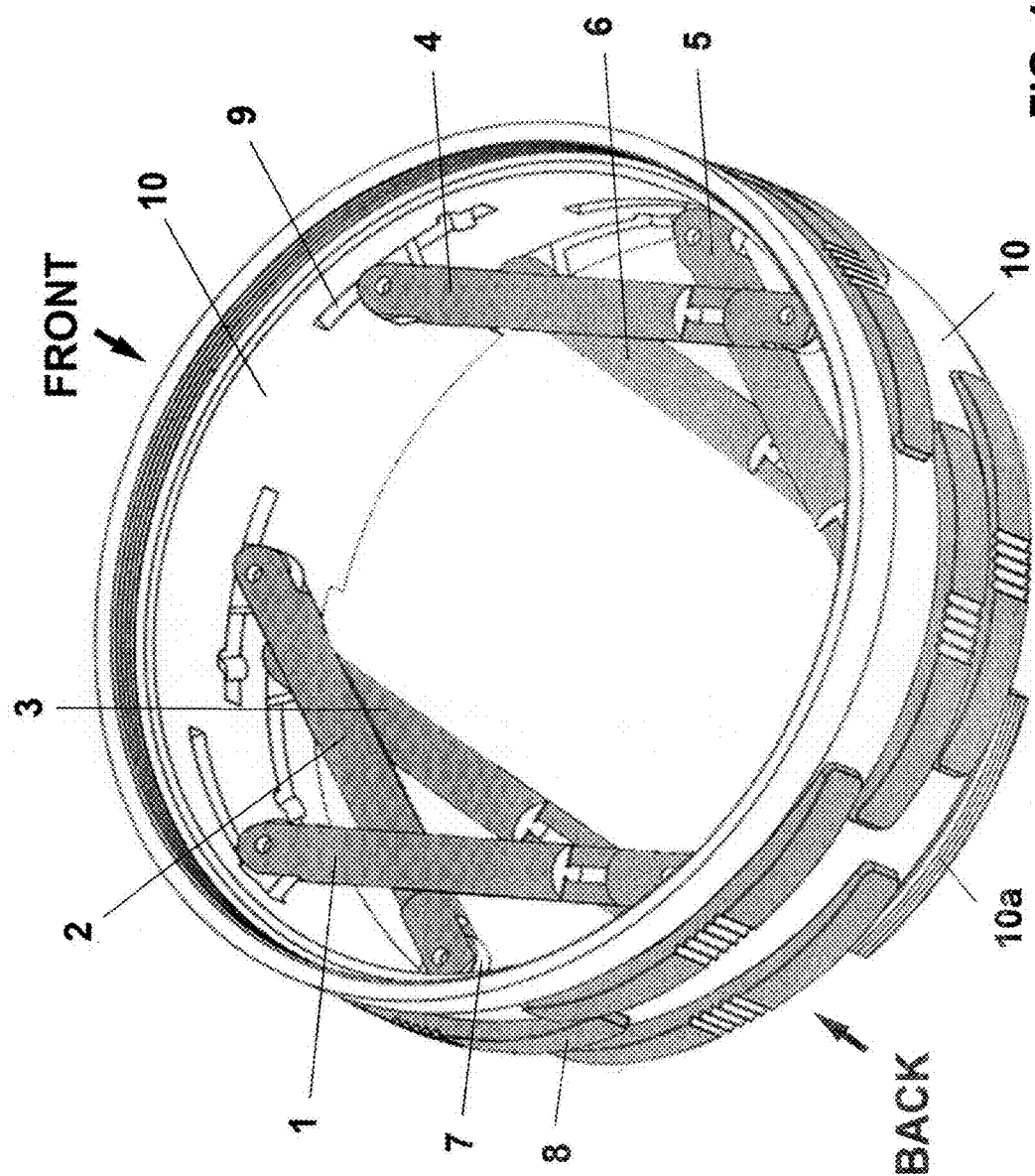

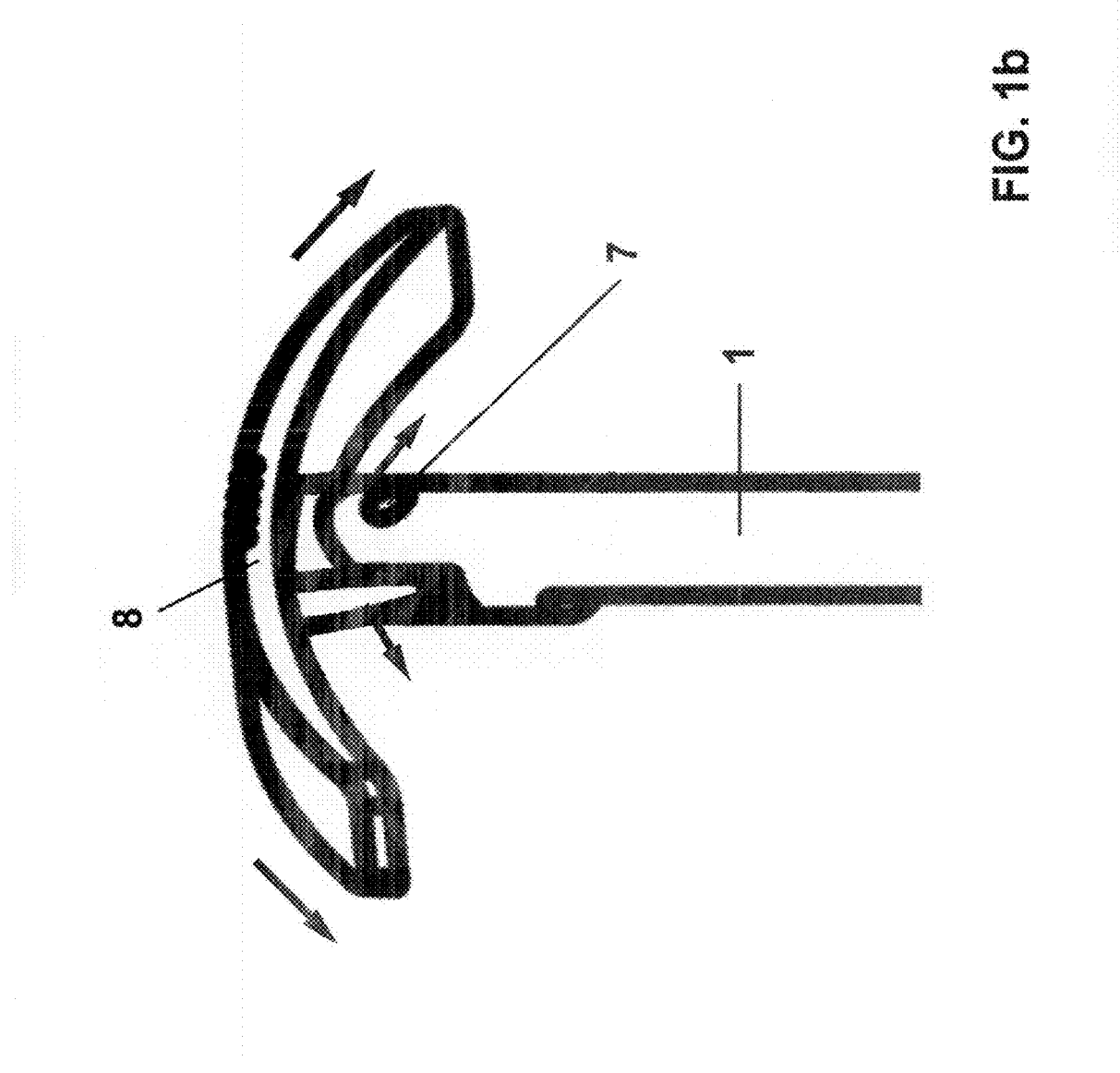

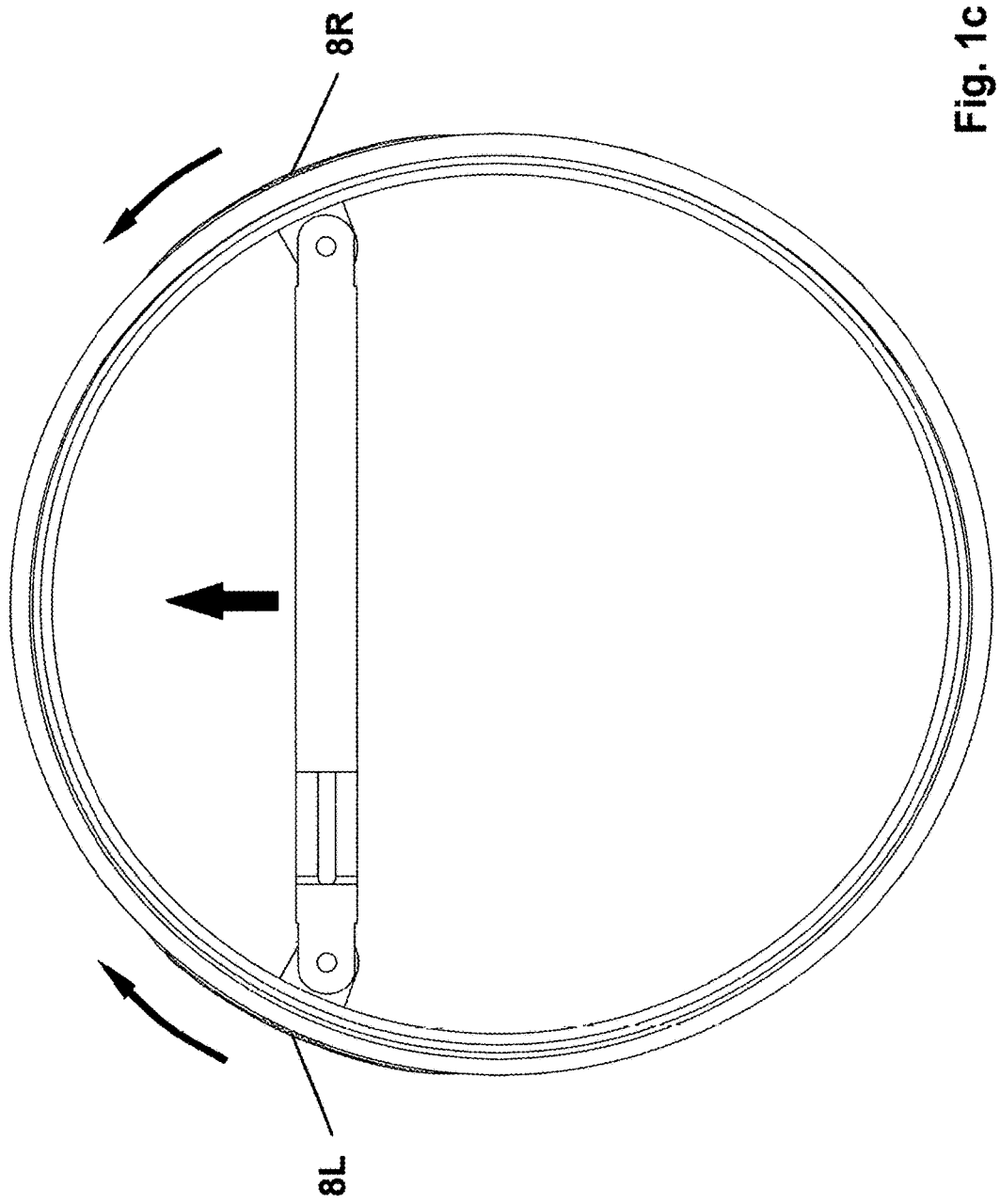

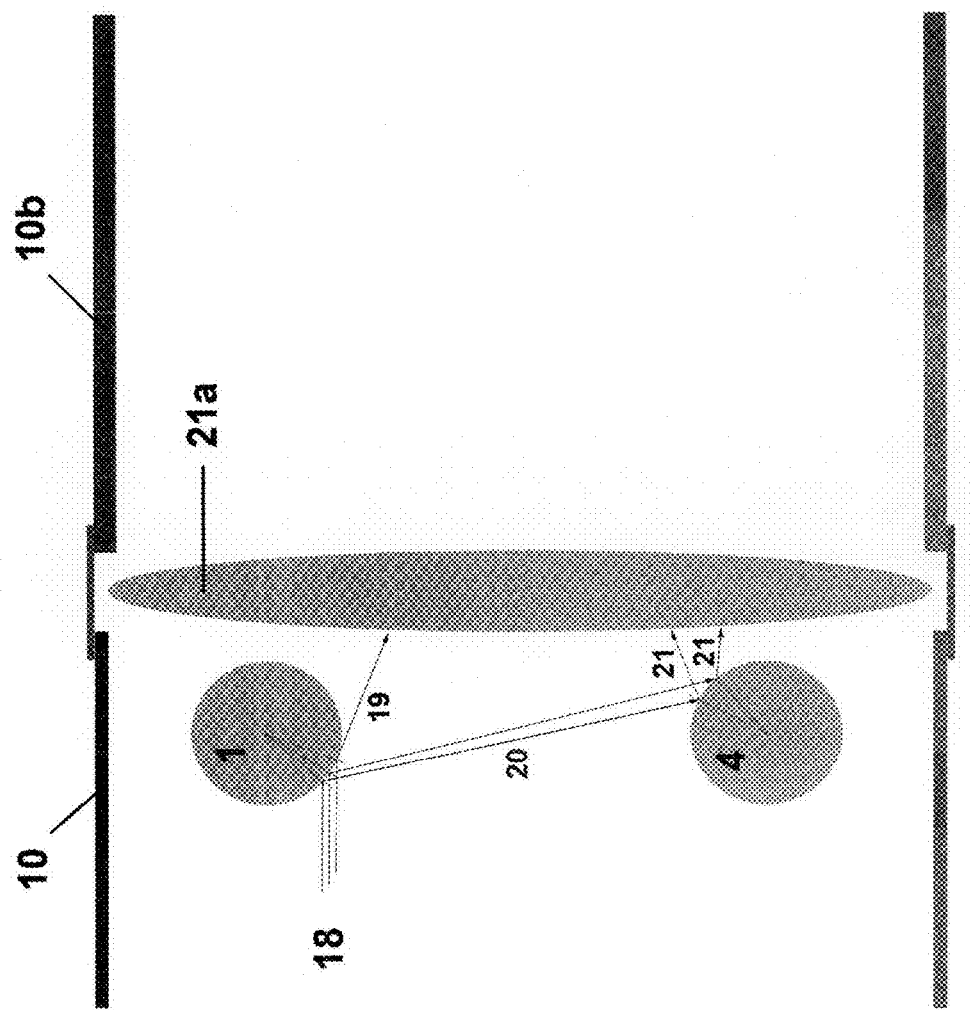

EZ HI-DEF

CROSS-REFERENCE TO RELATED APPLICATIONS

This application claims benefit to U.S. Nonprovisional patent application Ser. No. 12/609,310 filed on Oct. 30, 2009 and U.S. Provisional Patent Application 61/946,455 filed on Jan. 6, 2014 the disclosure of which is incorporated herein by reference.

BACKGROUND OF THE INVENTION

High-definition television (HDTV) is superior to digital television. Its high-resolution pictures can be viewed on a big screen. One can enjoy more details and less fuzzy in the picture. High capacity of pixels is utilized to fill in the empty squares of the frame. The fast speed of the picture frames results in less flicker of the motion pictures.

Photography is on the trend to keep up with television evolution, but it has not reached the level of high definition yet. Many designs from prior art utilized mirror plates to produce 3D photographs. On one hand, there has been a race in the market on who has more megapixels in the digital camera. Similar to television, it has been thought that pixels would solve flat and fuzzy problem in digital photographs. On the other hand, several methods of post-photo processing, i.e. focus after shot, red eye reduction, . . . are employed to get a better photo. However, on account of the present invention, EZ Hi-Def. device provides new technology and low cost to achieve the goal with real-time image data, more details, more depth of space, and no fuzzy pictures both on print and on a big view screen.

SUMMARY

EZ Hi-Def. device provides a high level of integration both structurally and functionally in a digital camera. The size of proportional to the size of the camera lens. There are several sizes commercially available, ranging from 52 mm to 82 mm, or more. Its proximity to the lens is also critical to reflection of image. The device provides high efficiency of gathering and reflecting light to the lens. This technology can apply to future scientific research and education where high definition photograph is used as a tool.

The embodiment of the invention provides a digital camera with a device that can affect the light ray path to the lens. It can effectively gather reflected rays from multiple light sources around the object of interest. Six round bars are parallel to the camera lens and arranged in a hexagon shape. They facilitate and modulate light rays from the live object to the lens.

BRIEF DESCRIPTION OF THE DRAWINGS

FIG. 1a: EZ Hi-Def. device
FIG. 1b: Round bar handle and joint
FIG. 1c: A longer round bar
FIG. 6: Round bars modulate light

DETAILED DESCRIPTION OF THE INVENTION

The present invention is a removable device that is mounted on the lens of a digital camera, which in turn is capable of producing a high definition photo. The device assists the camera lens to harvest the image data effectively and efficiently. In photography, how much light or how light rays captured by the lens affects the quality of a photo. Too much light leads to being overexposed, and the opposite leads to being underexposed. Each light ray is an essential element to reflect detail from live object to the camera lens.

Figure 1D:
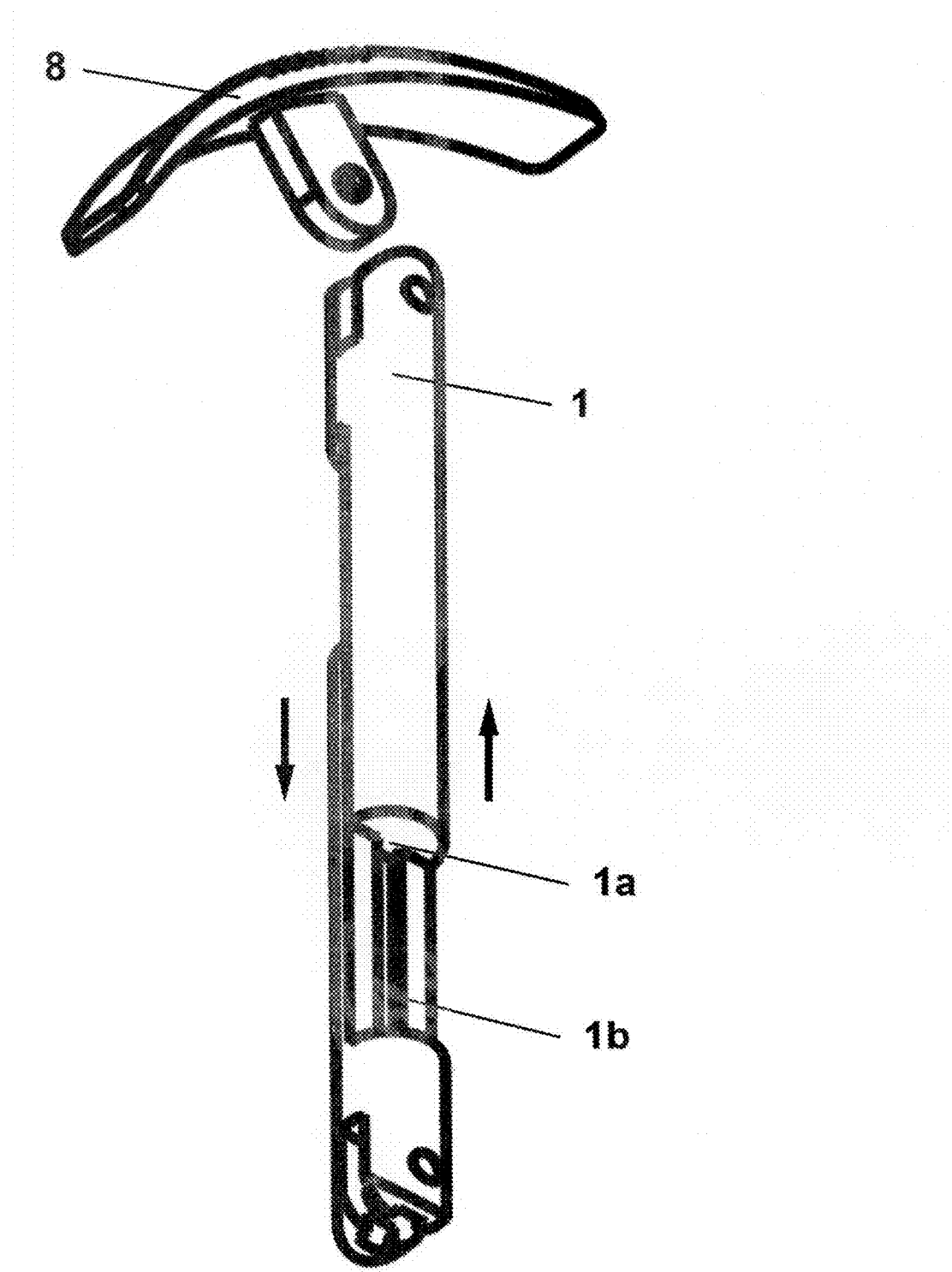
FIG. 1d: Rail/groove slide mechanism of round bar

FIG. 1 shows physical appearance of EZ Hi-Def. device. It is manufactured to fit the lens diameter. There is a size for each commercially available digital camera lens. Once the device is in place, light passes through the device to the lens. It is important to know how a digital camera works. Light zooms into camera lens then hits photo sensor which sends an electrical signal to the detector called charge-couple-device. This CCD breaks up the picture into millions of pixels. The color brightness of each pixel is then stored as a number. A digital photograph is a series of numbers.

It is once thought in a digital camera the higher megapixel, the higher resolution of the picture. This explains why the image taken from a low megapixel digital camera can neither be viewed on a large screen no printed on a big-sized photo without being fuzzy. To achieve a high resolution photo, there are two approaches, a huge me pixel or an increase in efficiency of light capture of the lens. The second task is what the present invention tackles. EZ Hi-Def. device is a breakthrough in photography; it raises a digital photograph to a higher level, a high definition photograph. The simplicity of the device results a low cost for consumers who can utilize their grandpas' digital cameras with the device to take high definition photos.

Figure 2:
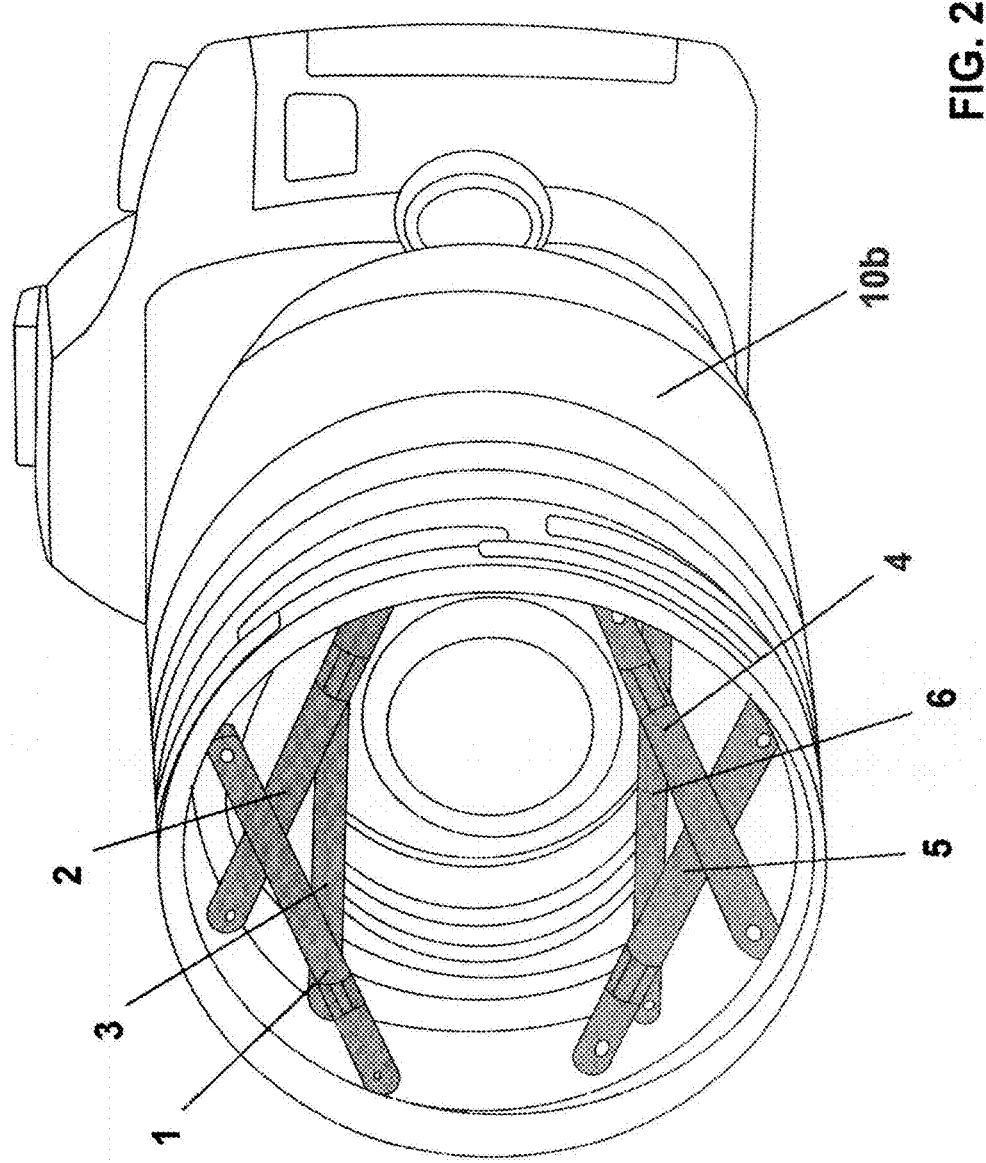
FIG. 2: EZ Hi-Def. removably mounted to a camera lens

FIG. 2 is a side-by-side comparison between two cameras with and without EZ Hi-Def. device. Without a device, the light rays from the live object zoom into the lens (FIG. 2a). In old school of digital photography, lighting plays an important role in quality of picture. In fact, a lot of money has been poured into lighting business. However, photographers have never thought how light rays travel to the lens (FIG. 2b) can enhance the resolution of the picture. The present invention will change that thought. EZ Hi-Def. device facilitates and modulates those reflected rays of live object before coming into the lens. Details of how it accomplishes this task will be explained in FIG. 3a.

EZ Hi-Def. device provides the camera an advantage in lighting effect. Without a device, a camera requires an adequate lighting for a clear picture. On the other hand, the reflecting activities of the bars contribute additional light through the lens. This good light source mimics soft even light to assist photo shooting. Therefore, the high efficiency in capturing and reflecting light of the bars of the device enables the camera to function well even in a low light setting.

The present invention is a device which can be removably mounted to the camera lens 10b. Connector 10a as a part of base ring 10 (FIG. 1a) connects the device to the camera lens 10b in FIG. 2. Six round bars 1, 2, 3, 4, 5, 6 in FIG. 1 with 1 parallel to 4, 2 parallel to 5 and 3 parallel to 6 are arranged in hexagon shape to gather light 18 and reflect light 19 to lens elements 21a. All round bars are parallel to lens elements 21a.

In FIG. 1b, a joint 7 connects the end of round bar 1 to bar handle 8. There are two bar handles 8L and 8R for each round bar with total of twelve bar handles for six round bars. Bar handle 8 is located outside of the base ring 10 in FIG. 1a. Round bar is shortened when being moved away from the center FIG. 1c. Opening 9 in the base ring 10 guides the movement of the bar handle 8.

Figure 3:
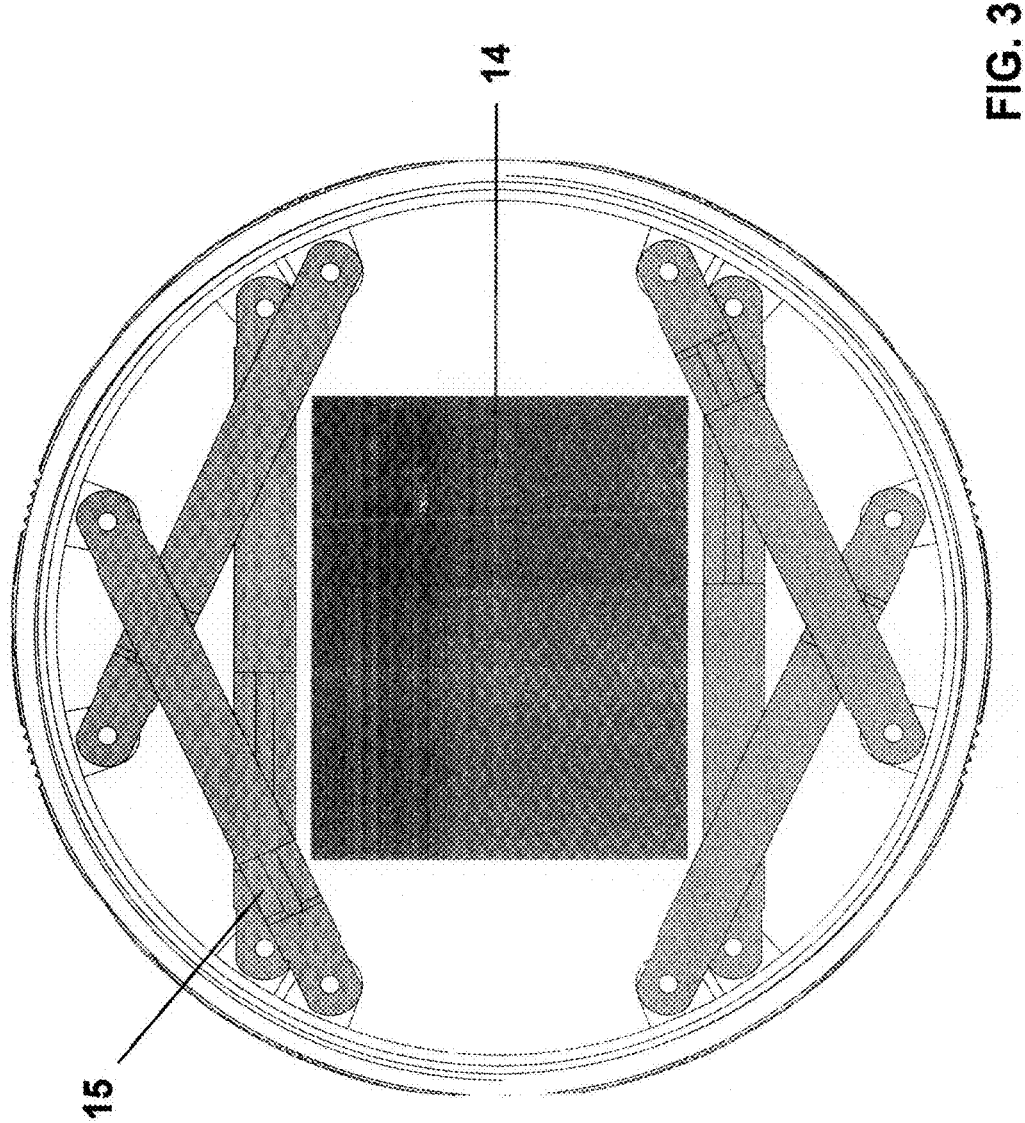
FIG. 3: What round bars look like in taking near-view photographs
Figure 4:
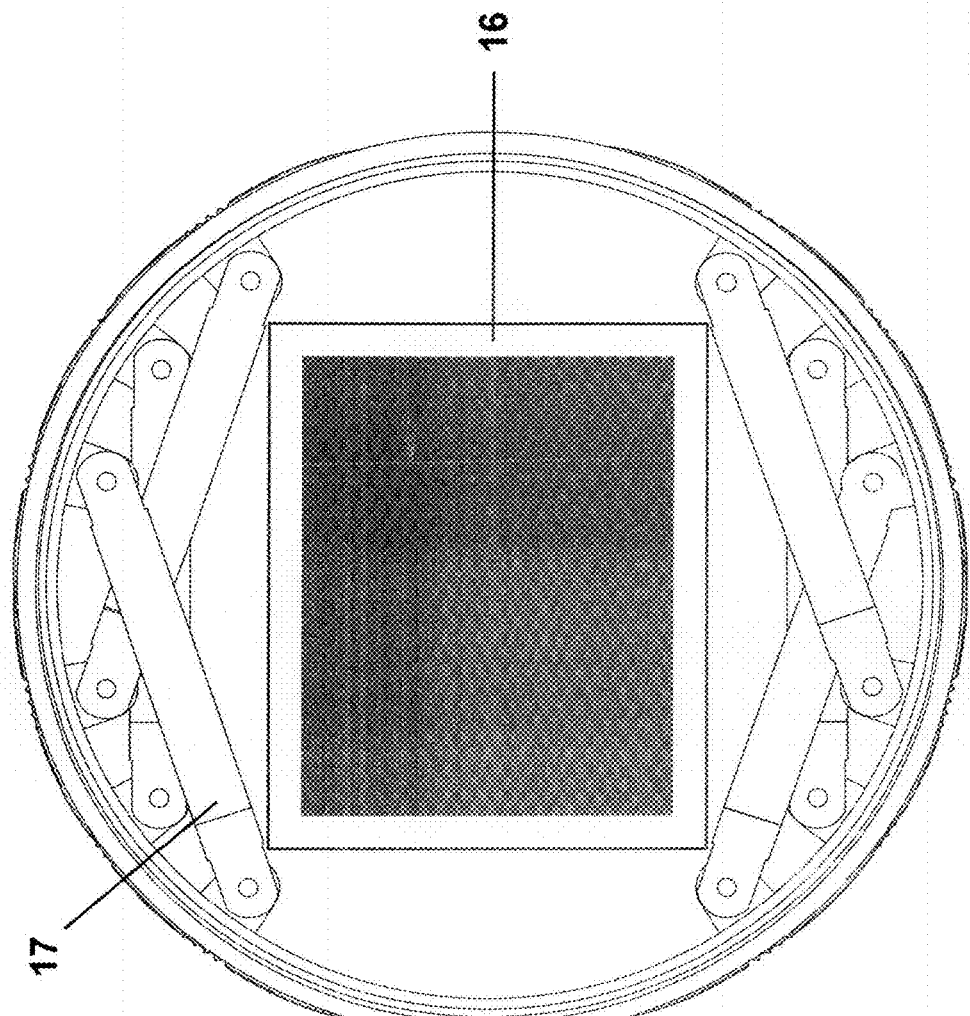
FIG. 4: What round bars look like in taking far-view landscapes

When a near-view picture 14 is photographed, round bars are moved closer to the center of the base ring (FIG. 3). Notice round bar 15 in FIG. 3 is longer when being moved toward the center of the base ring 10. However, if a far-view landscape 16 is photographed, round bars are moved away from center of the base ring (FIG. 4). Notice round bar 17 appears shorter. A mechanism to lengthen or shorten the round bar is using rail 1a and groove 1b slide in FIG. 1d.

Figure 5:
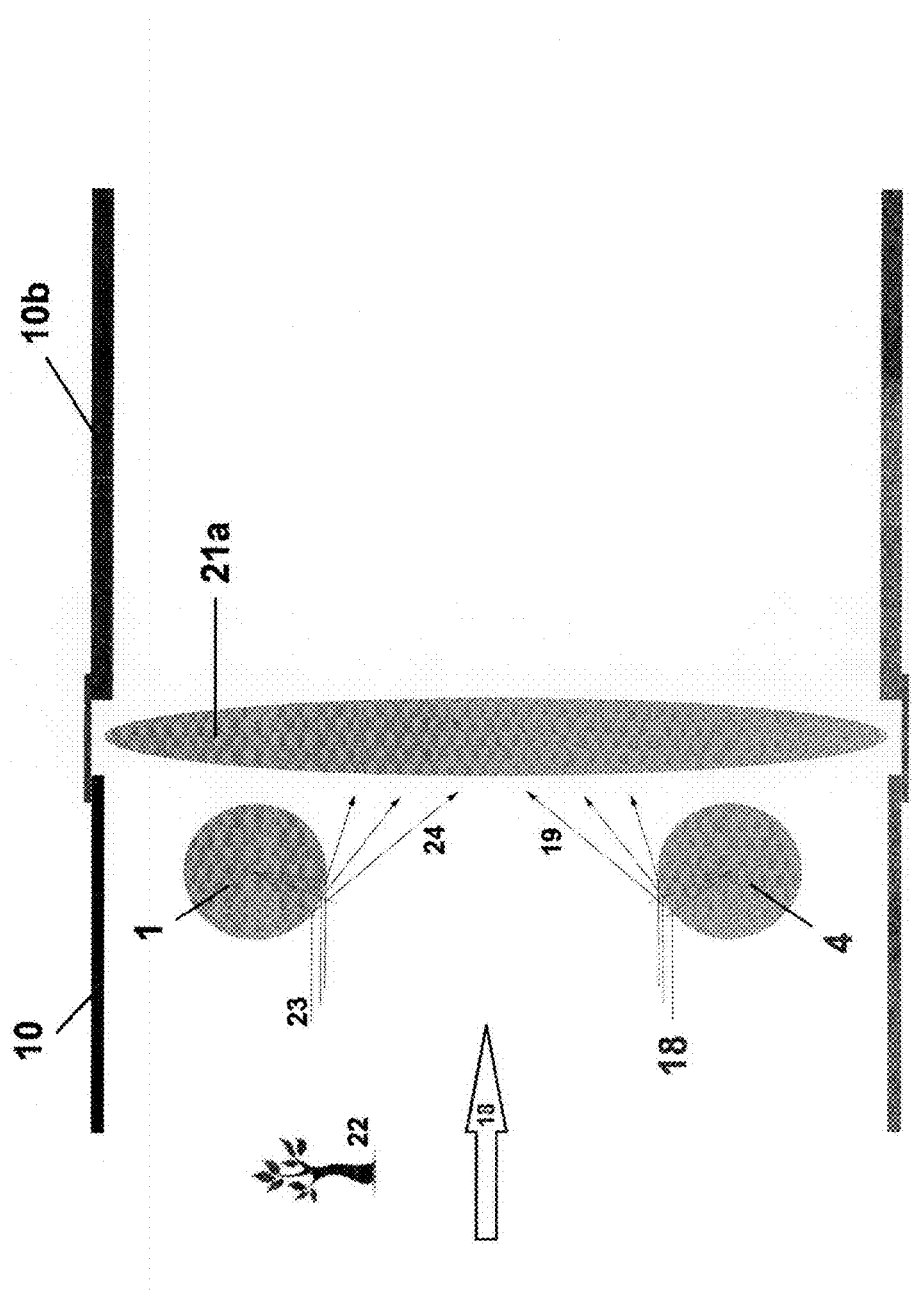
FIG. 5: Round bars facilitate light

FIG. 5 is cross-section of round bars 1 and 4. Both bars gather incoming light rays 18 and send reflected light rays 19 to lens elements 21a of the camera. Round bar is an efficient form to facilitate light to lens elements 21a.

Incoming light 18 is not only reflected to lens elements 21a as shown 19, but it can also be reflected from bar 1 to 4 as light ray 20 in FIG. 6. Subsequently, reflected light 20 gets reflected to lens elements 21a from bar 4 as shown light ray 21. Clearly, parallel round bars 1 and 4 modulate light to lens elements 21a. Similar results are observed with parallel bars 2 and 5 and parallel bars 3 and 6.

Reflected light rays 19, 21 from round bars to lens elements 21a in FIG. 6 by coincidence illuminate lens elements 21a. This illumination provides extra lighting to the lens; hence, six round bars 1, 2, 3, 4, 5, 6 function as an illuminator to assist a photographer taking a photo under low light condition like indoor, in the shade, or overcast weather.

Furthermore, illumination of round bars as discussed in paragraph makes digital camera more light sensitive than camera without round bars. In Axis communication, the object reflecting more light to camera lens led to more light capture by the camera or increased light sensitivity of the camera. In other words, more data was captured for the photo.

Schematic diagram of FIG. 5 shows 3D image data 23 of reflected light from live object 22 to bar 1 (since each reflected light ray is an essential element of image data); then, 3D image data 24 is reflected from bar 1 to lens elements 21a. Similar results are observed with round bars 2, 3, 4, 5, 6. As a result, six round bars 1, 2, 3, 4, 5, 6 reflect six sets of 3D images 24 to a digital camera to produce a high definition photograph with more data, more details, more depths of space, . . . than digital camera without round bars mounted in front of camera lens 10b.

Connector 10a connects the base ring 10 to the camera lens 10b. A wide range of sizes of base ring enables EZ Hi-Def. device to fit and work with any digital camera with 8 mega pixels or higher. Base ring sizes are available from 52 mm to 82 mm or more.

What is claimed is:

1. EZ Hi-Def device comprising:
   a cylindrical base ring having an inside surface;
   wherein the cylindrical base ring is configured to detachably attach to a camera lens,
   six round bars;
   wherein the six round bars are arranged to form three bar pairs such that each of the bar pairs comprises two parallel round bars, wherein each of the six round bars is adjustably attached to the inside surface of the cylindrical base ring, wherein an optical axis of the camera lens is between each of the bar pairs and wherein each of the six round bars having a reflective surface for reflecting light from an object into the camera lens.

2. The device according to claim 1 wherein the six round bars are arranged in a hexagon shape and each of the six round bars is parallel to the lens.

3. The device according to claim 2 wherein joints connect to an end of each of the six round bars, and openings located in the base ring to guide the joint for adjusting the each of the six round bars.

4. The device according to claim 3, further comprising a mechanism to lengthen or shorten each of the six round bars using rail/groove slide.

5. The device according to claim 4 wherein each of the six round bars modulates light to the camera lens.

6. The device according to claim 5 wherein each of the six round bars assists photographer taking photo under any one of the low light condition, indoor, in the shade or overcast weather when the device is attached to a camera.

7. The device according to claim 6 wherein each of the six round bar reflects 3D image from the object to the camera lens, and the camera processes six 3D images received from each of the six round bar to produce a high definition photograph with more data, more details and more depths of space.

8. The device according to claim 7 wherein a connector between the base ring and the camera lens enables the device in which the camera comprises a digital camera with at least 8 mega pixels.

* * * * *